United States Patent [19]

Weadon et al.

[11] Patent Number: 5,732,135
[45] Date of Patent: Mar. 24, 1998

[54] ASYMMETRIC HINGED HOUSING CONFIGURATION

[75] Inventors: Mark W. Weadon; Steven J. Harms, both of Raleigh, N.C.

[73] Assignee: Ericsson Inc., Research Triangle Park, N.C.

[21] Appl. No.: 685,797

[22] Filed: Jul. 19, 1996

Related U.S. Application Data

[63] Continuation of Ser. No. 345,189, Nov. 28, 1994, abandoned.

[51] Int. Cl.⁶ .................................................. H04M 1/00
[52] U.S. Cl. ........................................ 379/433; 379/434
[58] Field of Search ............................. 379/433, 434, 379/428, 429; 455/89, 90, 128; 16/328, 329, 331

[56] References Cited

U.S. PATENT DOCUMENTS

| D. 200,158 | 1/1965 | Zanuso et al. | D26/14 |
|---|---|---|---|
| D. 207,490 | 4/1967 | Zanuso et al. | D26/14 |
| D. 207,491 | 4/1967 | Zanuso et al. | D26/14 |
| D. 244,848 | 6/1977 | Todeschini | D14/56 |
| D. 244,849 | 6/1977 | Todeschini | D14/56 |
| D. 254,435 | 3/1980 | Ferron | D14/53 |
| D. 275,950 | 10/1984 | Marshall | D14/53 |
| D. 281,496 | 11/1985 | Chen | D14/53 |
| D. 281,686 | 12/1985 | Rivette et al. | D14/53 |
| D. 282,544 | 2/1986 | Wu | D14/53 |
| D. 282,738 | 2/1986 | Nichols | D14/53 |
| D. 284,468 | 7/1986 | Matras | D14/53 |
| D. 289,288 | 4/1987 | Muenscher et al. | D14/63 |
| D. 291,437 | 8/1987 | Lee | D14/53 |
| D. 291,990 | 9/1987 | Lee | D14/53 |
| D. 291,991 | 9/1987 | Lee | D14/64 |
| D. 292,581 | 11/1987 | Yoshiharu | D14/53 |
| D. 297,734 | 9/1988 | Soren et al. | D14/64 |
| D. 297,735 | 9/1988 | Soren et al. | D14/64 |
| D. 298,035 | 10/1988 | Watanabe | D14/64 |
| D. 298,036 | 10/1988 | Watanabe | D14/64 |
| D. 298,244 | 10/1988 | Watanabe | D14/64 |
| D. 298,940 | 12/1988 | Lau | D14/64 |
| D. 300,742 | 4/1989 | Soren et al. | D14/148 |
| D. 300,827 | 4/1989 | Soren et al. | D14/138 |
| D. 302,689 | 8/1989 | Murakami et al. | D14/138 |
| D. 304,189 | 10/1989 | Nagele et al. | D14/148 |
| D. 305,427 | 1/1990 | Soren et al. | D14/138 |
| D. 306,294 | 2/1990 | Watanabe | D14/148 |
| D. 306,298 | 2/1990 | Sawada et al. | D14/245 |
| D. 315,347 | 3/1991 | Walker | D14/147 |
| D. 317,606 | 6/1991 | Irie et al. | D14/138 |

(List continued on next page.)

FOREIGN PATENT DOCUMENTS

| 0535912A2 | 4/1993 | European Pat. Off. | |
| 535912 | 4/1993 | European Pat. Off. | 455/90 |
| 535912-A2 | 4/1993 | European Pat. Off. | 19/405 |
| 264748 | 9/1993 | United Kingdom . | |
| 93018592 | 9/1993 | WIPO | 455/90 |
| WO93/18592 | 9/1993 | WIPO . | |
| WO96/17463 | 6/1996 | WIPO . | |

*Primary Examiner*—Jack Chiang
*Attorney, Agent, or Firm*—Myers Bigel Sibley & Sajovec, LLP

[57] ABSTRACT

A radiotelephone having an asymmetric hinge configuration includes a housing having a door member, a handset member, and an asymmetric hinge connected to the door and handset members for enabling rotation therebetween about an axis of rotation that is substantially perpendicular to a plane bisecting the door member but preventing axial translation therebetween. The radiotelephone further includes a radiotelephone transceiver and a microphone positioned within the housing. The microphone is located on the pivot axis. The asymmetric hinge is configured so that the door and handset members are rotatable between a closed position, in which the door member overlies the handset member, and an operative open position, in which the handset member and the door member define an angle of between about 100 and 160 degrees.

23 Claims, 11 Drawing Sheets

U.S. PATENT DOCUMENTS

| | | | |
|---|---|---|---|
| D. 318,050 | 7/1991 | Elbaz et al. | D14/138 |
| D. 318,275 | 7/1991 | Benjelloun | D14/148 |
| D. 319,053 | 8/1991 | Atkins | D14/138 |
| D. 319,233 | 8/1991 | Konno et al. | D14/147 |
| D. 319,234 | 8/1991 | Konno et al. | D14/147 |
| D. 319,441 | 8/1991 | Konno et al. | D14/147 |
| D. 321,347 | 11/1991 | Colida | D14/138 |
| D. 321,349 | 11/1991 | Colida | D14/138 |
| D. 325,028 | 3/1992 | Nagele et al. | D14/138 |
| D. 325,029 | 3/1992 | Nagele et al. | D14/138 |
| D. 326,091 | 5/1992 | Kikuchi | D14/138 |
| D. 326,262 | 5/1992 | Soren et al. | D14/138 |
| D. 328,294 | 7/1992 | Stilley | D14/138 |
| D. 334,568 | 4/1993 | Giordano, Jr. et al. | D14/138 |
| 2,508,654 | 5/1950 | Sears | 179/103 |
| 3,476,886 | 11/1969 | Ferrari et al. | 179/103 |
| 3,551,607 | 12/1970 | Tommasi et al. | 179/100 |
| 3,824,465 | 7/1974 | Blough | 326/16 |
| 4,018,998 | 4/1977 | Wegner | 179/103 |
| 4,218,808 | 8/1980 | Chu | 16/141 |
| 4,424,420 | 1/1984 | Haskins | 179/164 |
| 4,471,493 | 9/1984 | Schober | 455/90 |
| 4,481,382 | 11/1984 | Villa-Real | 179/2 EA |
| 4,661,659 | 4/1987 | Nishimura | 379/61 |
| 4,845,772 | 7/1989 | Metroka et al. | 379/61 |
| 4,897,873 | 1/1990 | Beutler et al. | 379/433 |
| 4,912,602 | 3/1990 | Zurek et al. | 361/399 |
| 4,926,474 | 5/1990 | Marks | 379/433 |
| 5,014,346 | 5/1991 | Philips et al. | 455/89 |
| 5,027,394 | 6/1991 | Ono et al. | 379/434 |
| 5,111,503 | 5/1992 | Takagi | 379/433 |
| 5,117,073 | 5/1992 | Mischenko | 200/61.7 |
| 5,151,643 | 9/1992 | Emmert et al. | 320/2 |
| 5,170,173 | 12/1992 | Krenz et al. | 343/702 |
| 5,175,759 | 12/1992 | Metroka et al. | 379/63 |
| 5,185,790 | 2/1993 | Mischler | 379/433 |
| 5,257,310 | 10/1993 | Takagi et al. | 379/433 |
| 5,259,019 | 11/1993 | Stilley | 379/58 |
| 5,260,998 | 11/1993 | Takagi | 379/433 |
| 5,274,882 | 1/1994 | Persson | 16/303 |
| 5,278,993 | 1/1994 | Reiff et al. | 455/90 |
| 5,303,291 | 4/1994 | Takagi et al. | 379/433 |
| 5,384,844 | 1/1995 | Rydbeck | 379/433 |

ASYMMETRIC HINGED HOUSING CONFIGURATION

This application is a continuation of application Ser. No. 08/345,189, filed Nov. 28, 1994, now abandoned.

FIELD OF THE INVENTION

This invention relates generally to a hinge configuration, and more particularly to a hinge configuration suitable for use with a cellular telephone.

BACKGROUND OF THE INVENTION

The portable radiotelephone, also known as a "cellular" telephone, has become an increasingly popular item for both personal and commercial use. Some users, such as doctors, attorneys, salespersons, real estate brokers, and the like, often find that carrying a telephone on their person or in a motor vehicle is quite helpful and convenient, and in some instances almost essential, to performing their professional tasks.

To further increase the convenience afforded by radiotelephones, the trend has been for radiotelephone units to be increasingly smaller for easier storage and portability. To this end, the "flip" phone was developed. A flip phone, an example of which is shown in U.S. Pat. No. Des. 304,189 to Nagele et al., comprises a handset portion and a "flip" cover. The handset portion houses push buttons for activating the radiotelephone and sending dialing tones, a signal receiving unit and amplifier, and other components associated with the operation of the radiotelephone. The flip cover, which may house the mouthpiece and its associated microphone, is hingedly attached to one end of the handset portion. The flip cover is movable between a closed position, in which it overlies the push button keypad and prevents damage thereto, and one or more operative positions, in which the cover has pivoted about the interconnecting hinge to expose the keypad for operation. For speaking into the flip phone, the cover typically pivots to a position in which it forms an angle of approximately 135 degrees with the handset portion. In this position, the phone is configured so that when the speaker is placed adjacent a user's ear, the flip cover is positioned adjacent a user's mouth; as a result, the flip phone can be used in much the same manner as a conventional radiotelephone. Movement of the flip cover also typically exposes the speaking microphone, which can be located in either the handset or the flip cover itself. Even if the microphone is located in the handset, the design of the flip cover and its placement in the operative position can influence the performance of the telephone, as the flip cover can acoustically enhance the voice signal received by the microphone and thus enable a less powerful (i.e., lower gain) microphone to be included in the unit.

The radiotelephone typically includes structures that lock the flip cover into the both the closed and the open positions. It is particularly important that the flip cover lock snugly into the closed position; otherwise, agitation or other movement of telephone, particularly to a position in which the cover faces downwardly, may cause the phone to be activated inadvertently. It is also important that the cover lock snugly in the operative position for the user's convenience.

One variety of cellular telephone having a hinged flip cover employs a hinge configuration that comprises a pair of spring-biased axles that can slide along the pivot axis of the hinge. Each of the axles is inserted into a receptacle in the flip cover, which also houses a spring that biases the axles away from the receptacle. The axles and the receptacle are configured so that the axles can translate along the pivot axis but cannot rotate relative to the flip cover; thus, rotation of the flip cover about the pivot axis causes the axles to rotate similarly. The other end of each axle includes a pair of sloping planes that form a wedge. The wedge end of the axle is inserted into a receptacle on the handset that terminates at its deepest portion with two sloping planes formed into an inverse wedge that can mate with the axle wedge. The inverse wedge of the receptacle is oriented about the pivot axis so that when the flip cover is in the operative position, the axle wedge and receptacle inverse wedge can mate, thereby locking the flip cover in the operative position. The spring urges the axles to translate away from one another and toward their respective receptacles and thus provides resistance to rotation of the flip cover from the operative position. However, movement of the flip cover away from the operative position causes the axle wedges to be oriented in a non-mating position relative to the handset receptacles. In this position, the axle wedges translate within the flip receptacle toward one another. In the closed position, the axles have not reached a second mating rotative position relative to the handset receptacles (which would be 180 degrees about the pivot axis from the operative position), but the interaction between the axle wedges and the handset receptacles is such that the biasing of the spring on the axles urges them to continue to rotate toward the opposed mating position. Of course, the handset prevents such rotation from occurring. As a result, the flip cover remains in and is urged toward the closed position.

Although this has been a successful design, there are certain shortcomings. As noted above, because these telephones are portable, it is desirable for a telephone to be as compact as possible. Unless the microphone for the phone is located in the flip (a condition which is undesirable for many phone models), it should be located as near the flip as possible to minimize the distance between it and the user's mouth. However, the wedge-shaped axle hinge design requires a spring of such length that, for a typical radiotelephone, there is insufficient space at the pivot axis for the microphone. Instead, the microphone is located above (i.e., toward the end of the handset opposite the hinge) the pivot axis, thereby requiring a more powerful microphone.

In addition, the wedge-shaped axle design can complicate assembly and maintenance of the phone. The typical handset is housed within a "clamshell"-type housing having mating top and bottom covers. The electronic components of the phone are assembled in the bottom cover; the top cover is then placed onto the bottom cover and attached. Wedge-shaped axle hinge designs of the type described hereinabove may require that the flip cover be attached to the top cover prior to its being attached to the bottom housing. As a result, the performance of the fully assembled handset unit is tested with the flip cover already being in place. Also, any repair to the flip cover may require that the handset housing be disassembled, an operation which substantially increases the time and cost for repair.

SUMMARY OF THE INVENTION

In view of the foregoing, it is an object of the present invention to provide a hinge configuration that enables the microphone of a flip-style radiotelephone to be located at or near the pivot axis about which the flip cover rotates.

It is also an object of the present invention to provide a hinge configuration that enables the entire housing of a flip-style radiotelephone to be assembled and performance tested prior to the attachment of the flip cover to the handset.

It is another object of the present invention to provide a hinge configuration that enables the flip cover of a flip-style radiotelephone to be removed for repair without requiring opening the housing of the handset.

These and other objects are satisfied by the present invention, which includes a radiotelephone having an asymmetric hinge configuration. The radiotelephone comprises a housing comprising a door member, a handset member, and an asymmetric hinge connected to the door and handset members for enabling rotation therebetween about an axis of rotation that is substantially perpendicular to a plane bisecting the door member but preventing axial translation therebetween. The radiotelephone further comprises a radiotelephone transceiver and a microphone positioned within the housing. The microphone is located on the pivot axis. The asymmetric hinge is configured so that the door and handset members are rotatable between a closed position, in which the door member overlies the handset member, and an operative open position, in which the handset member and the door member define an angle of between about 100 and 160 degrees. In this configuration, the microphone can be located in the handset member of the housing at the end thereof to which the door member is attached, rather than being located in a position spaced somewhat from that end of the handset. Because the microphone so located is positioned nearer to the user's mouth, the designer has additional options regarding the type of microphone that can be used.

In a preferred embodiment, the hinge configuration comprises an axle that comprises a shaft received in a first axle receptacle located in the door member and a projection received in and matable with a second axle receptacle located in the handset member. The axle is rotatable between first and second rotative positions about the axis of rotation and is translatable between first and second translatory positions along the axis of rotation. The hinge configuration further comprises interlocking means (preferably an elongated key and slot configuration) for connecting the axle with the door member so that the rotation of the door member relative to the handset member about the axis of rotation causes corresponding rotation of the axle and so that the axle is free to translate within the first axle receptacle along the axis of rotation. The hinge configuration further comprises a spring or other biasing means which is operably coupled with the axle for biasing the axle toward the second axle receptacle. The axle projection and the second axle receptacle are configured so that when the axle is in the first rotative position, the projection mates with and seats in the second axle receptacle and the biasing means biases the axle to take the first translatory position along the axis of rotation. This places the door member is in its operative position. When the axle is in the second rotative position, the projection is not seated in the axle receptacle, and interaction between the projection and the axle receptacle forces the axle into the second translatory position along the axis of rotation. This places the door member in the closed nonoperative position.

The hinge configuration of the present invention is easily assembled, and also enables the handset unit to be performance-tested entirely assembled prior to interconnection with the door member.

BRIEF DESCRIPTION OF THE FIGURES

Some of the features and advantages of the invention have been stated, others will become apparent from the detailed description which follows, and from the accompanying drawings, in which.

DETAILED DESCRIPTION OF THE INVENTION

The present invention now will be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete, and will fully convey the scope of the invention to those skilled in this art.

Figure 1:
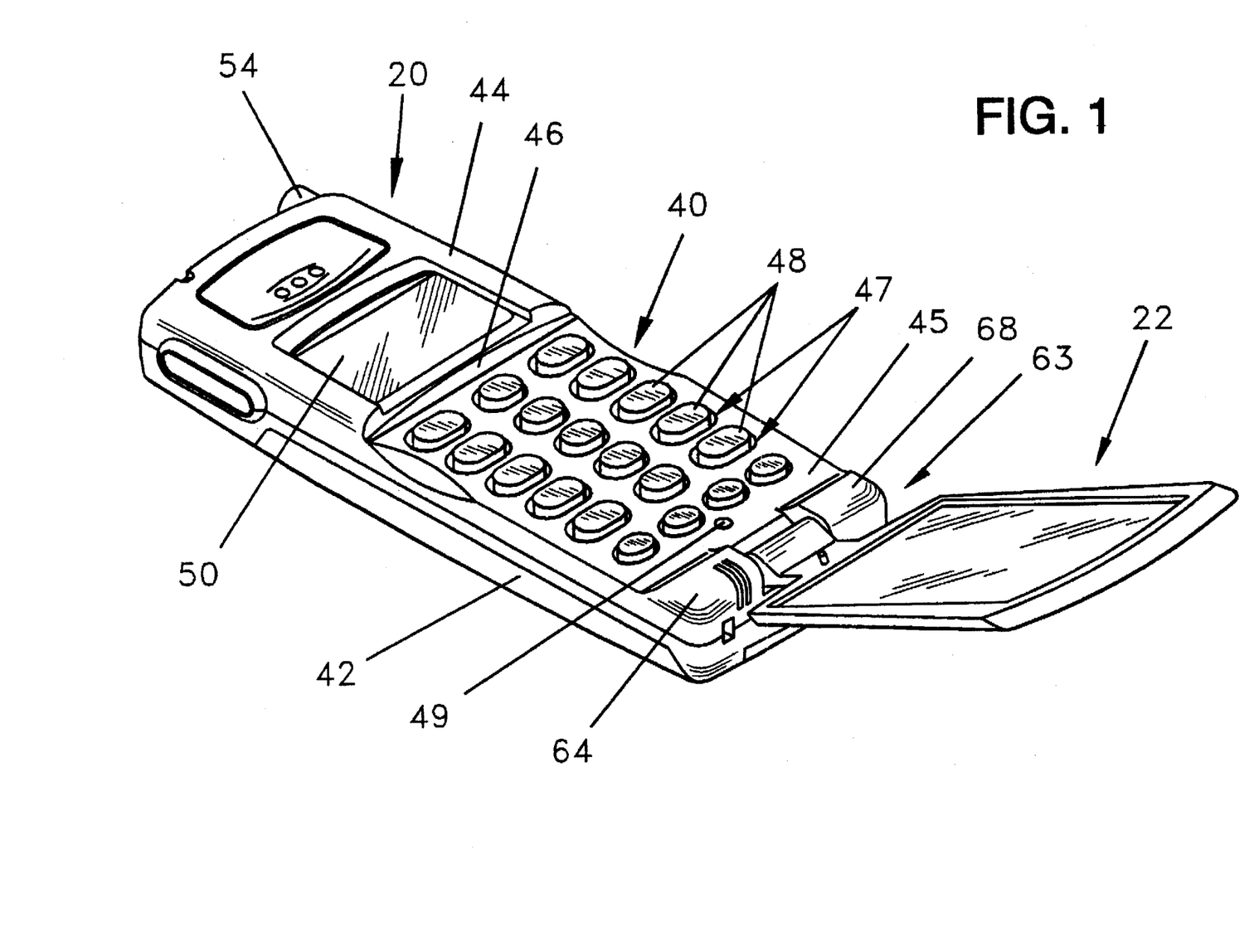
FIG. 1 is a perspective view of a radiotelephone of the present invention with the flip cover in its operative position.

Referring now to the drawings, a radiotelephone, designated broadly at 20, is shown in FIG. 1. The radiotelephone 20 comprises a handset unit 40 and a flip cover 22. The handset unit 40 is housed within a top housing 44 and a bottom housing 42 connected thereto to form a cavity therein. The flip cover 22 is pivotally interconnected with one end of the top housing 44 via an asymmetric hinge 63.

Figure 2:
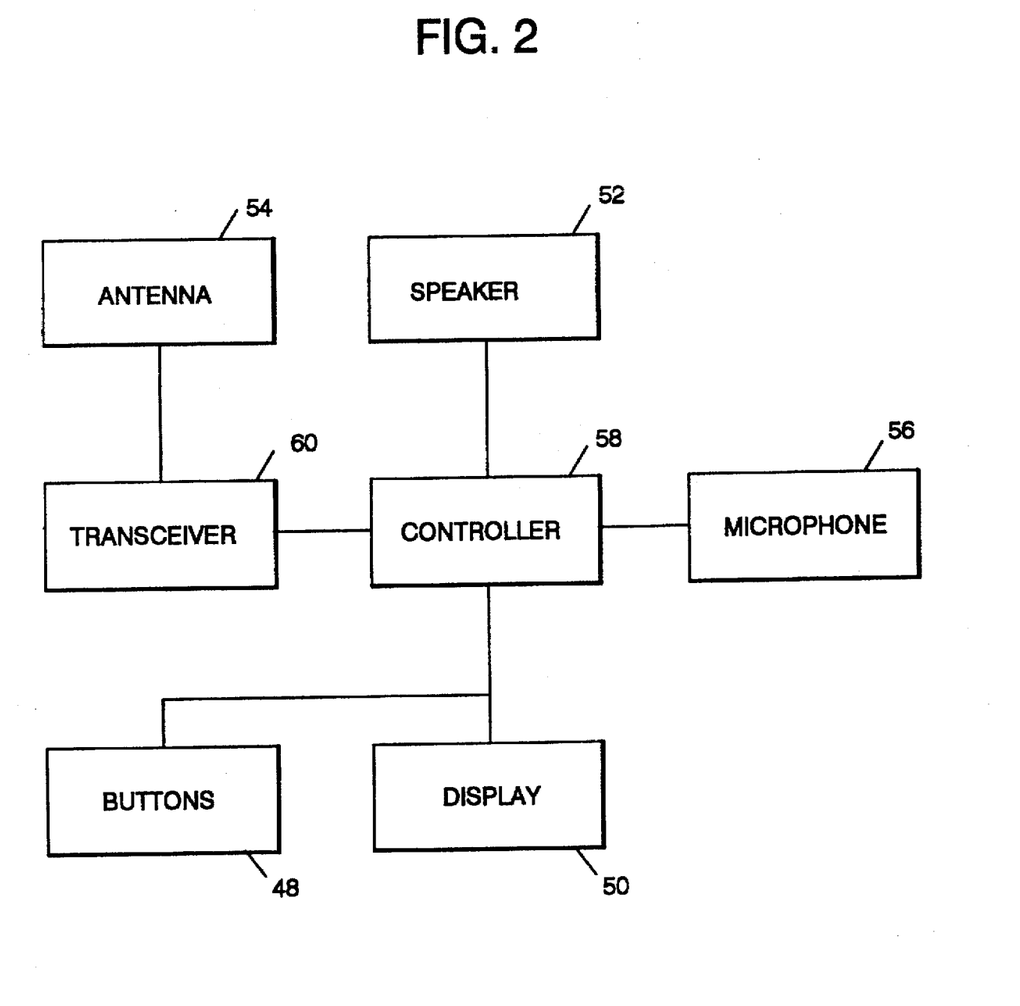
FIG. 2 is a block diagram illustrating schematically electrical interconnections between the electronic components of the radiotelephone.

The bottom and top housings 42, 44 enclose electronic components that enable the radiotelephone 20 to transmit and receive telecommunication signals. A typical arrangement of these electronic components is shown schematically in FIG. 2. An antenna 54 (also visible in FIG. 1) for receiving telecommunication signals is electrically connected to a radiofrequency transceiver 60 that is further electrically connected to a controller 58, such as a microprocessor. The controller 58 is then electrically connected to a speaker 52 that transmits a remote signal from the controller 58 to a user of the radiotelephone 20. The controller 58 is also electrically connected to a microphone 56 that receives a voice signal from a user and transmits it through the controller 58 and the transceiver 60 to a remote device. The controller 58 is also electrically connected to a plurality of keypad buttons 48 and to a display window 50 that facilitate phone operation. Those skilled in this art will appreciate that radiotelephones having other electronic components are also suitable for use with of the present invention.

Figure 4:
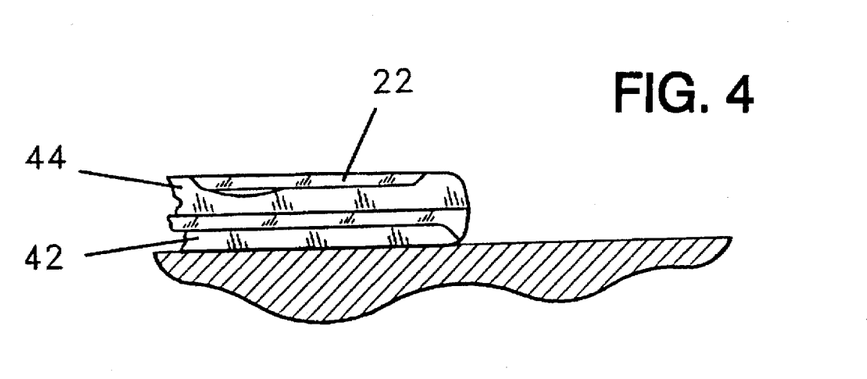
FIG. 4 is a partial side view of a radiotelephone of the present invention with the flip cover in its closed position.
Figure 5:
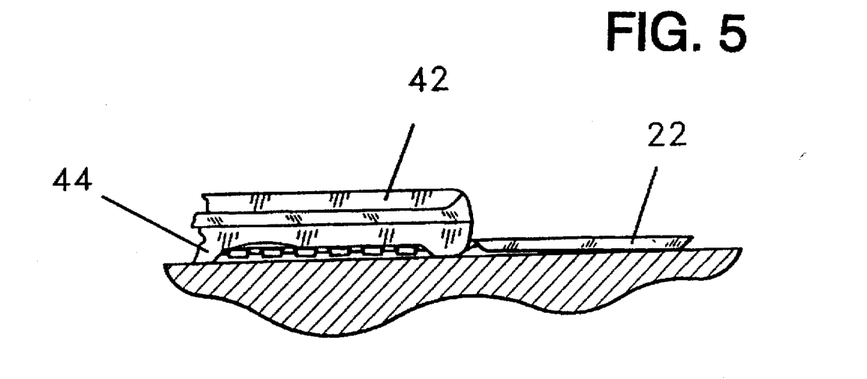
FIG. 5 is a partial side view of a radiotelephone of the present invention in which the radiotelephone is inverted and the flip cover is in its fully open position.
Figure 10:
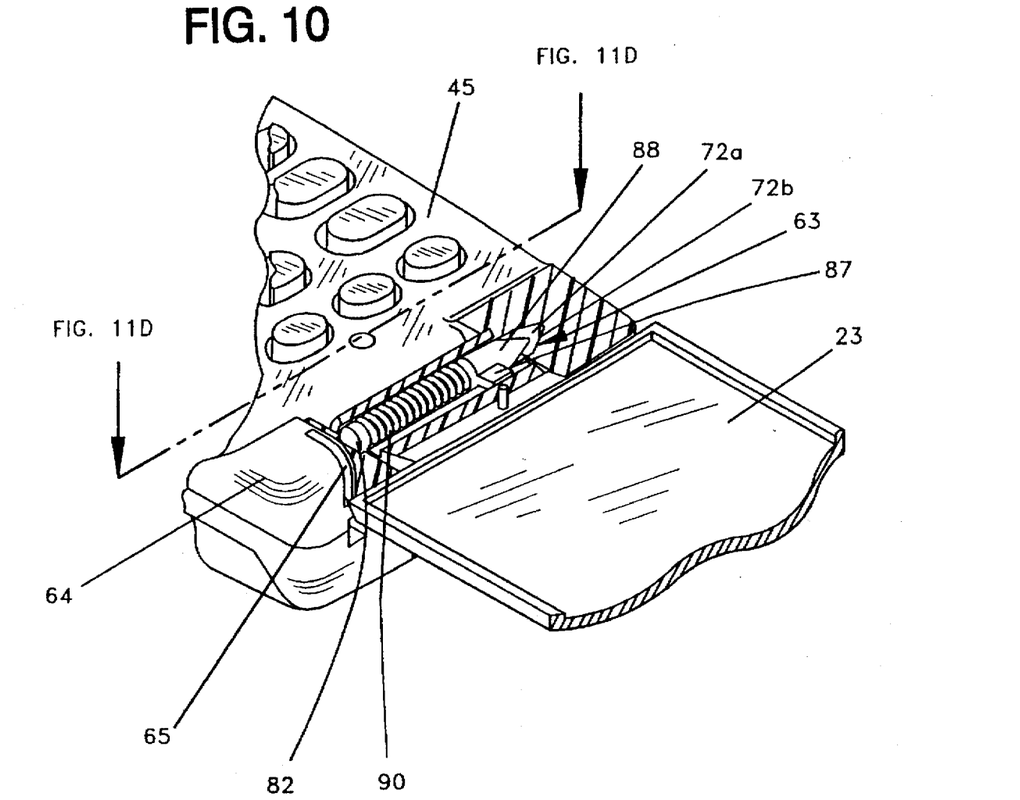
FIG. 10 is an enlarged partial cutaway view of the radiotelephone of the present invention with the flip cover in its fully open position.
Figure 11A:
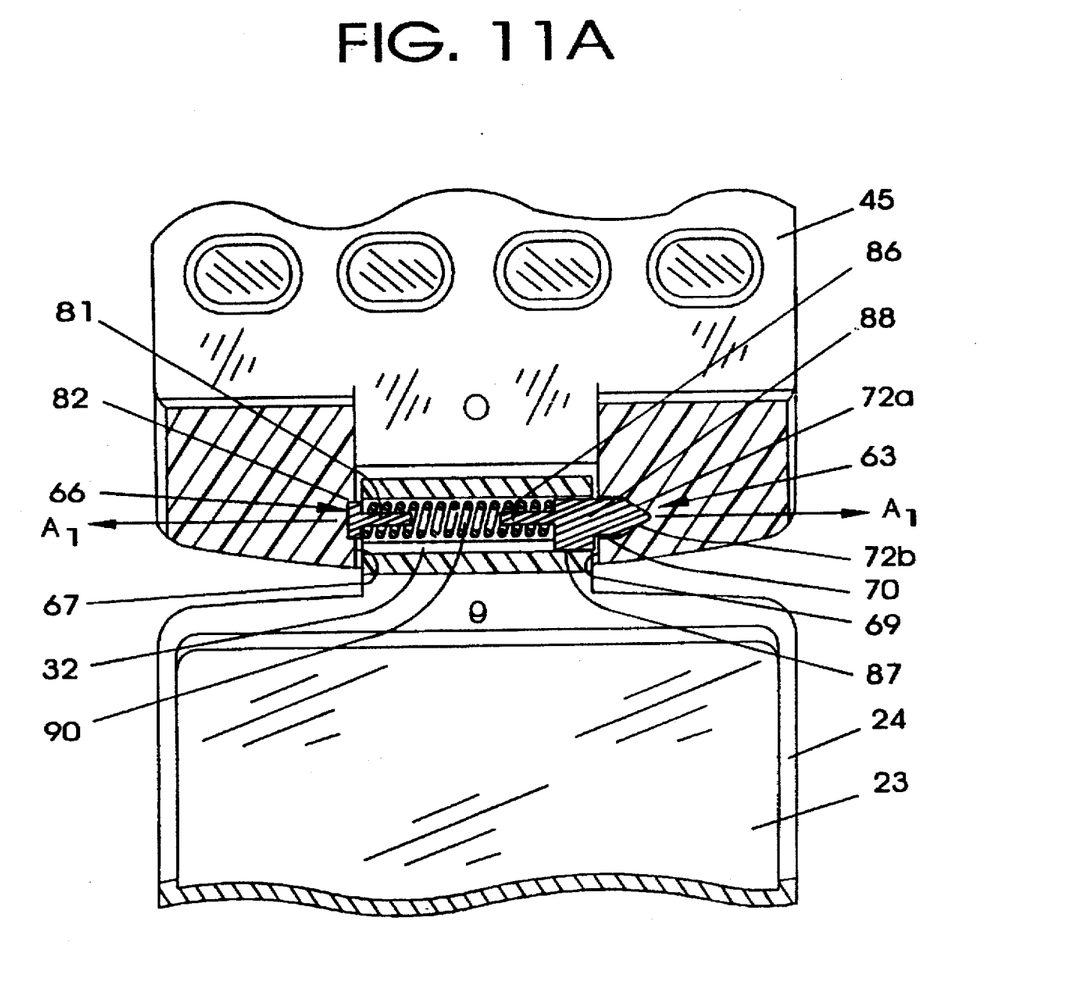
FIG. 11A is an enlarged cutaway top view taken along line 11A—11A of FIG. 7 showing the hinge configuration of the radiotelephone in its operative position.
Figure 11B:
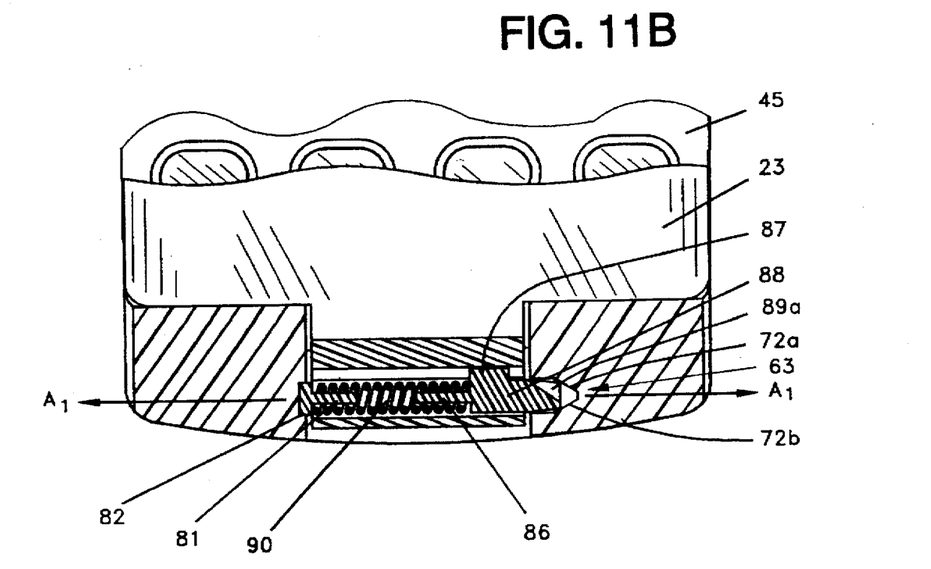
FIG. 11B is an enlarged cutaway top view taken along line 11B—11B of FIG. 8 showing the hinge configuration of the radiotelephone in its closed position.
Figure 11C:
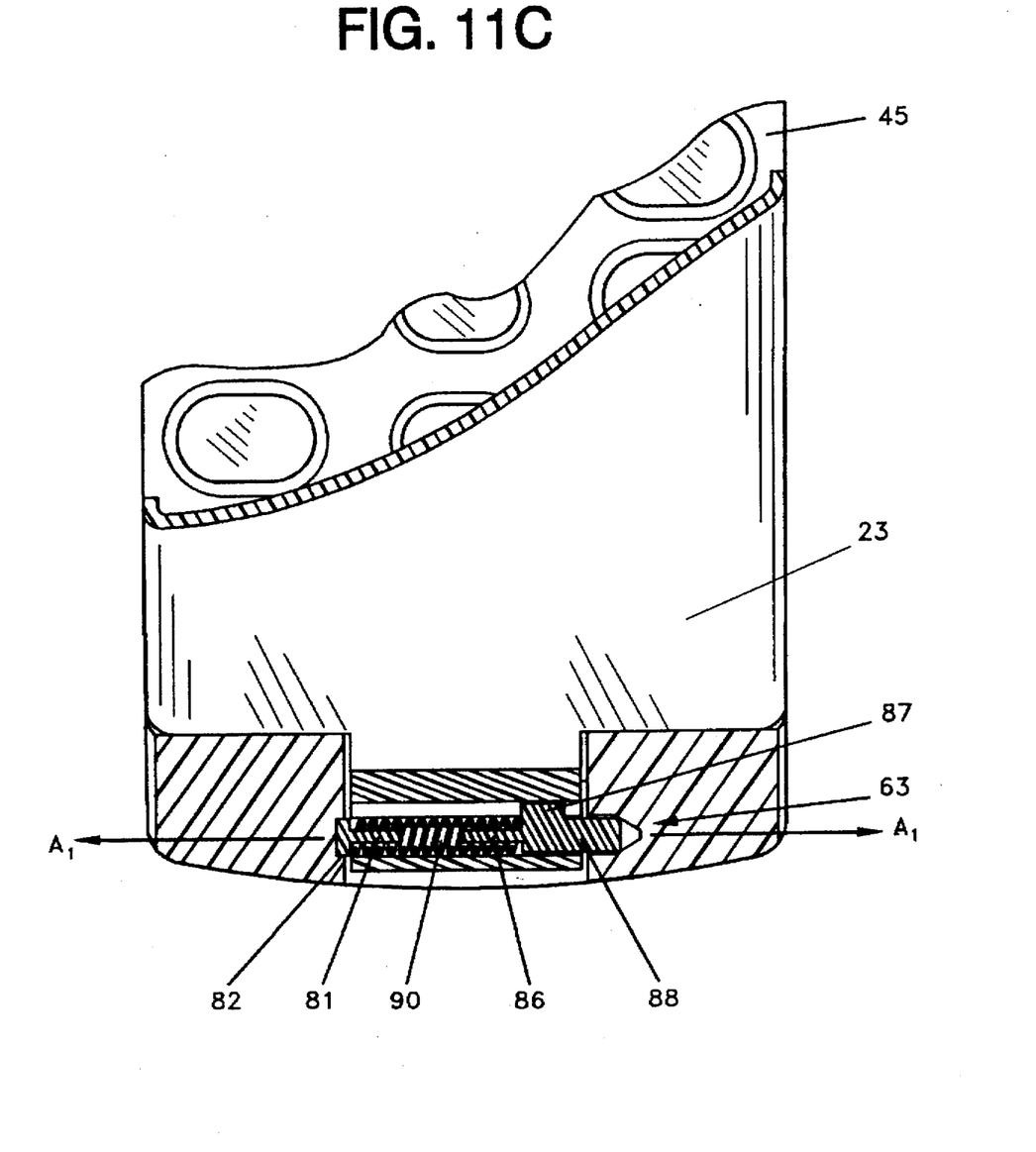
FIG. 11C is an enlarged cutaway top view taken along line 11C—11C of FIG. 9 showing the hinge configuration of the radiotelephone in an intermediate position.
Figure 11D:
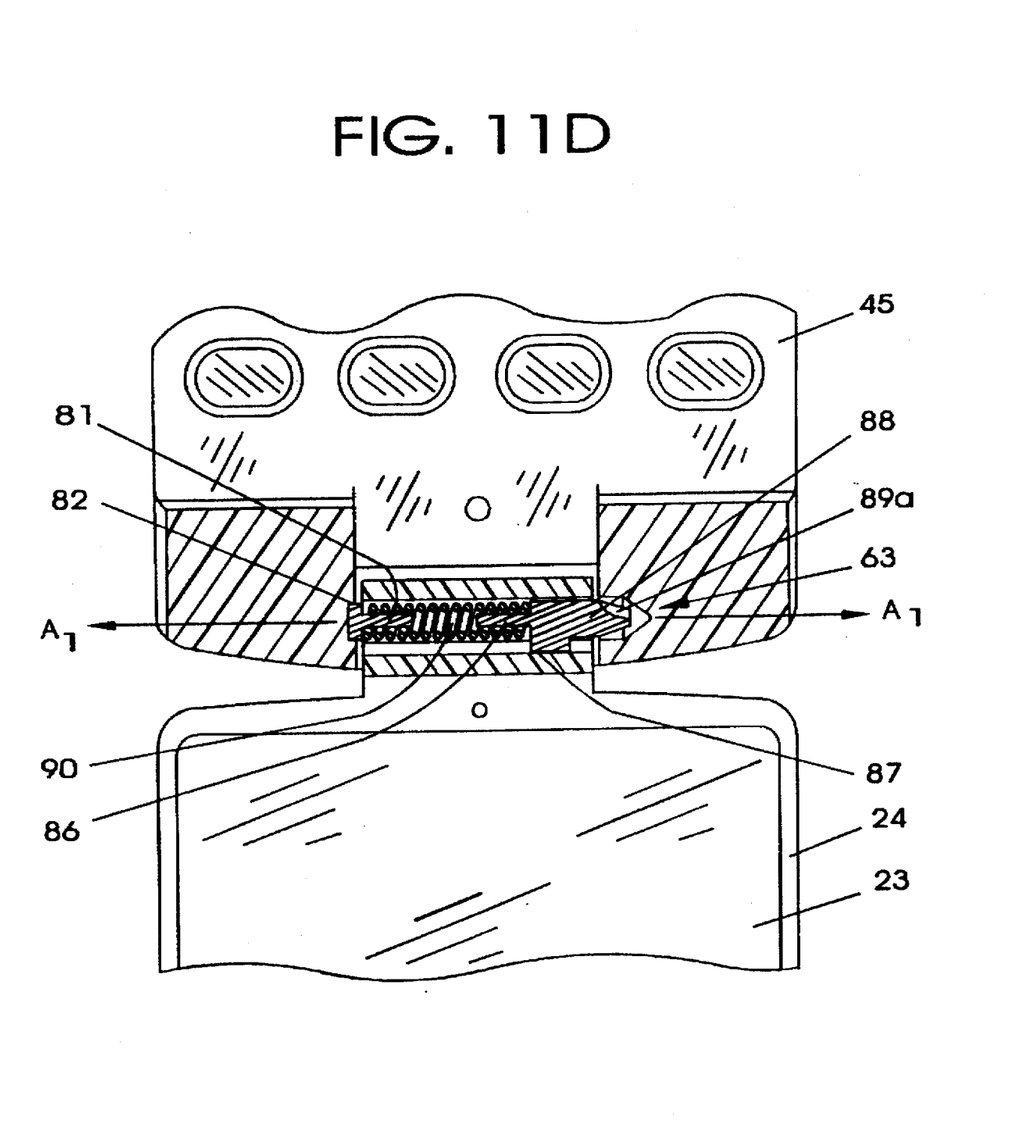
FIG. 11D is an enlarged cutaway top view taken along line 11D—11D of FIG. 10 showing the hinge configuration of the radiotelephone in its fully open position.

In operation, the flip cover 22 pivots relative to the top housing 44 about the asymmetric hinge 63 between a closed position (FIGS. 4, 8, and 11B), an operative position (FIGS. 1, 7, and 11A), and a fully open position (FIGS. 5, 10, and 11D). In the closed position, the flip cover 22 overlies the top housing 44, preferably in contacting relationship. In the operative position, the flip cover 22 has pivoted about a pivot axis A. (FIG. 1) relative to the top housing 44 between about 100 and 160 degrees, and preferably between about 130 and 140 degrees, from the closed position. The radiotelephone 20 is typically operated in this position; the flip cover 22 has "flipped" into a position in which it can assist in the acoustical transmission of the user's voice to the microphone 56 as the opposite end of the top housing 44 serves as an earpiece for the user. In the fully open position, in which the flip cover 20 has pivoted to a position between about 170 and 200 degrees from the closed position, the radiotelephone 20 can be inverted and placed on an underlying surface.

Figure 6A:
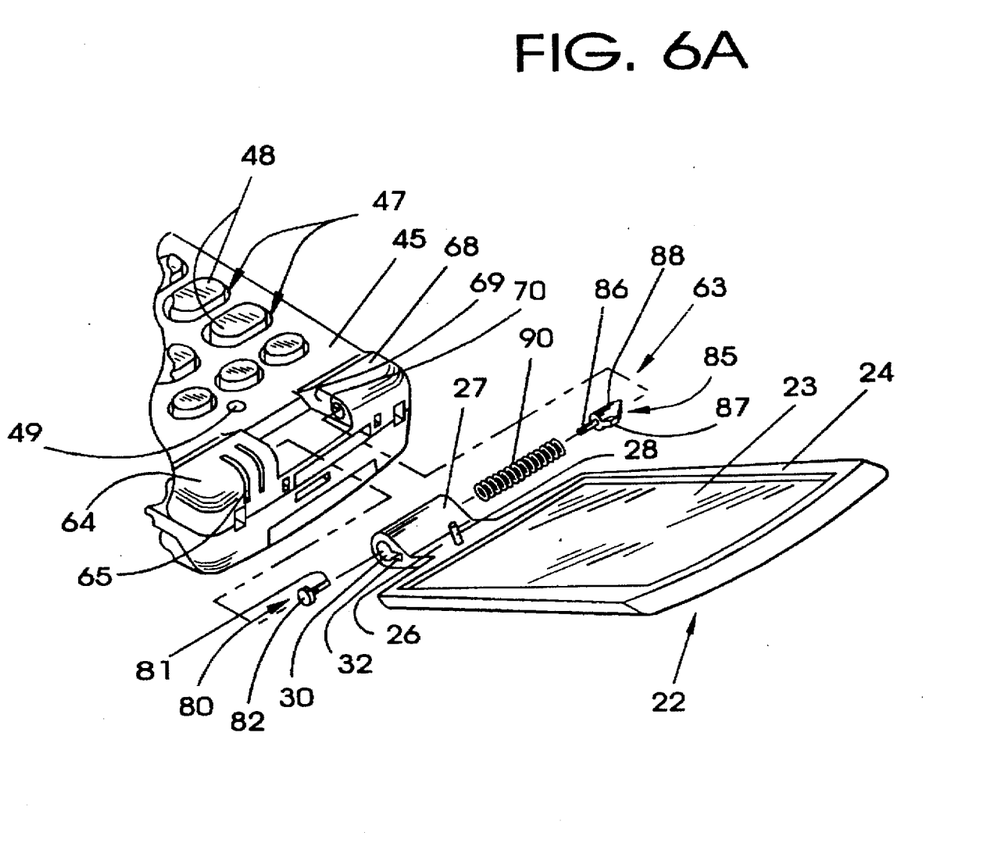
FIG. 6A is an enlarged exploded view of the radiotelephone of the present invention showing how the hinge axles and spring interconnect with the handset top housing and the flip cover.

The flip cover 22 comprises a generally planar rectangular body 23, a raised contact ridge 24 that extends about the periphery of the body 23 on all four edges, and a cantilevered hinge arm 26 that projects away from the contact ridge 24 generally parallel to the body 23 (FIG. 6A). At its free end, the hinge arm 26 includes a transversely-elongated bulbous portion 27. A cylindrical axle receptacle 30 extends transversely through the entire length of the bulbous portion 27. A key slot 32 that also extends transversely through the entire length of the bulbous portion 27 originates at the periphery of the axle receptacle 30 and extends radially therefrom toward the body 23. An operation post 28 originates near the junction of the contact ridge 24 and the hinge arm 26 and extends generally perpendicularly therefrom.

The top housing 44 includes a face plate 45 and a pair of laterally-positioned hinge shoulders 64, 68 (FIGS. 1 and 6A). The face plate 45 includes a contact surface 46 that contacts the flip cover 22 as it resides in the closed position, and also includes a plurality of button apertures 47 that receive keypad buttons 48 used to operate the radiotelephone 20. The face plate 45 also has an operation aperture 49 adjacent its hinged end portion. The operation aperture 49 is sized and positioned to receive the operation post 28 when the flip cover 22 is in its closed position. Insertion of the operation post 28 into the operation aperture deactivates the radiotelephone 20; conversely, removal of the operation post 28 from the operation aperture 49, which occurs when the flip cover 22 moves from the closed position, activates the radiotelephone for operation. Insertion of the operation post 28 into the operation aperture 49 also assists in laterally aligning the flip cover 22 relative to the handset unit 40 in the closed position.

As used herein, the term "activate" and derivatives thereof used in connection with the operation of the radiotelephone 20 indicate that the radiotelephone 20 has been connected with a telephone service and either can be or has been further connected with a remote telephonic device, such as another telephone, a facsimile machine, or the like. In layman's terms, an "activated" telephone is one which receives a "dial tone" from a telephone service or which is connected with another telephone line. Thus the term "activated" is intended to be synonymous with the art-recognized term "off-hook." Conversely, the term "deactivate" and derivatives thereof refer to a radiotelephone 20 is not connected with another telephone line or with a telephone service transmitting a dial tone; i.e., the term is intended to be synonymous with the art-recognized term "on-hook." Those skilled in this art will appreciate that, although it is preferred that activation and deactivation of the radiotelephone 20 be controlled by the interaction of the operation post 28 and the operation aperture 49, activation and deactivation of the radiotelephone 20 can be controlled by other means, including one or more of the push buttons 48.

The flip cover 22 is pivotally interconnected to the handset unit 40 via the asymmetric hinge 63. The asymetric hinge 63 includes an axle receptacle 66, an axle receptacle 70, an axle 80, a wedge-shaped axle 85, and a spring 90.

The hinge shoulder 64 of the top cover 44 includes an inner face 67 (FIG. 11A–11D) into which the cylindrical axle receptacle 66 is recessed. The hinge shoulder 64 also includes a pair of microphone slots 65 that originate at the upper surface of the hinge shoulder and extend to its end face. The microphone 56 (not seen in FIGS. 11A–11D) is positioned within the handset unit 40 beneath the microphone slots 65.

Figure 7:
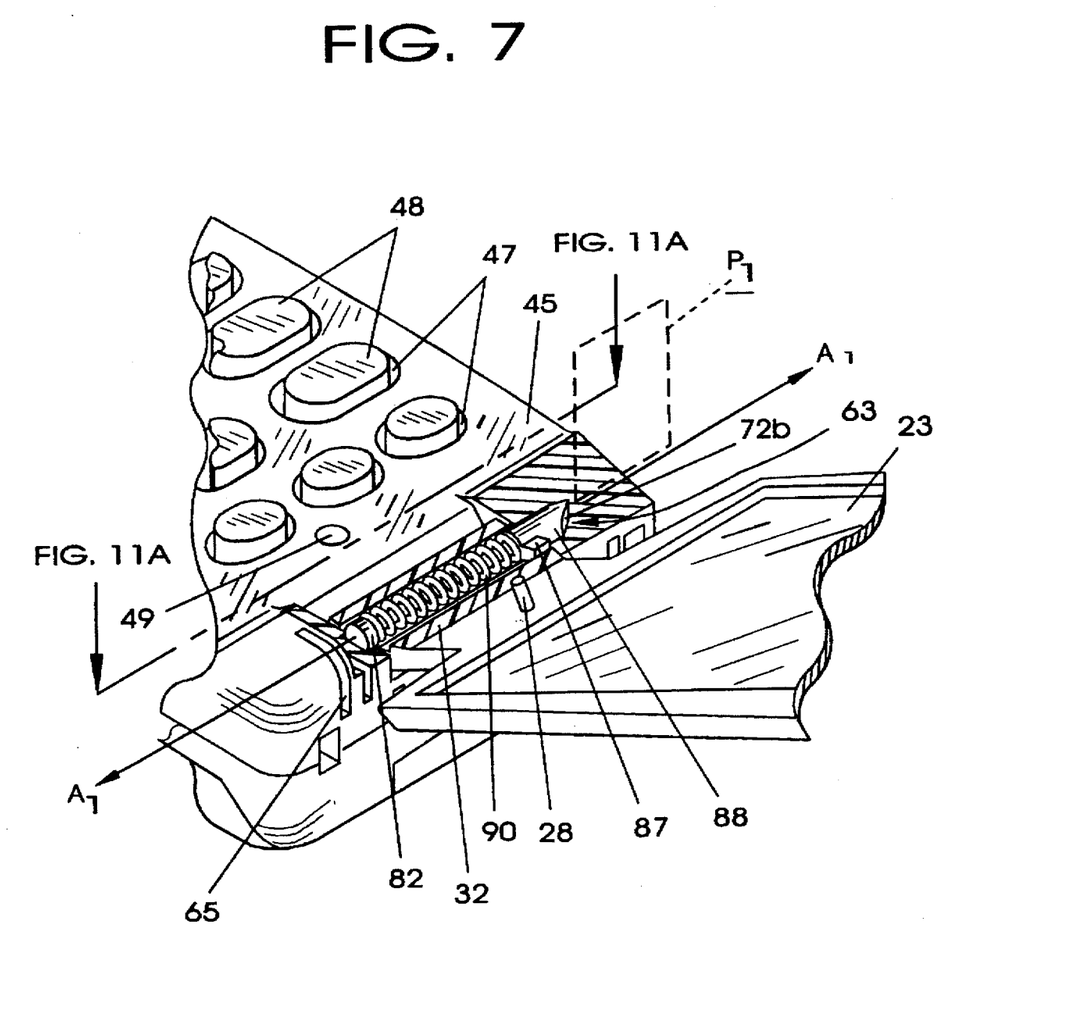
FIG. 7 is an enlarged partial cutaway view of the radiotelephone of the present invention with the flip cover in its operative position.

The hinge shoulder 68 includes an inner face 69 into which the generally cylindrical axle receptacle 70 is recessed. The receptacle 70 terminates at its deepest portion with a pair of sloping planes 72a, 72b (FIGS. 7 and 11B). These sloping planes 72a, 72b are essentially mirror images of one another about a substantially vertical plane $P_1$ that bisects the axle receptacle 70. The axle receptacle 70 and the axle receptacle 66 define a pivot axis $A_1$ that extends between the longitudinal centers thereof and is substantially perpendicular to a plane bisecting the flip cover 22. Notably, the microphone 56 resides on the pivot axis $A_1$.

The flip cover 22 and the handset unit 40 are pivotally interconnected by an axle 80, a wedge axle 85, and a spring 90 (FIG. 6A). The axle 80 comprises a cylindrical lug 82 and a shaft 81 of somewhat smaller diameter extending longitudinally therefrom. The lug 82 is sized to fit and rotate within the receptacle 66 of the hinge shoulder 64.

Figure 6B:
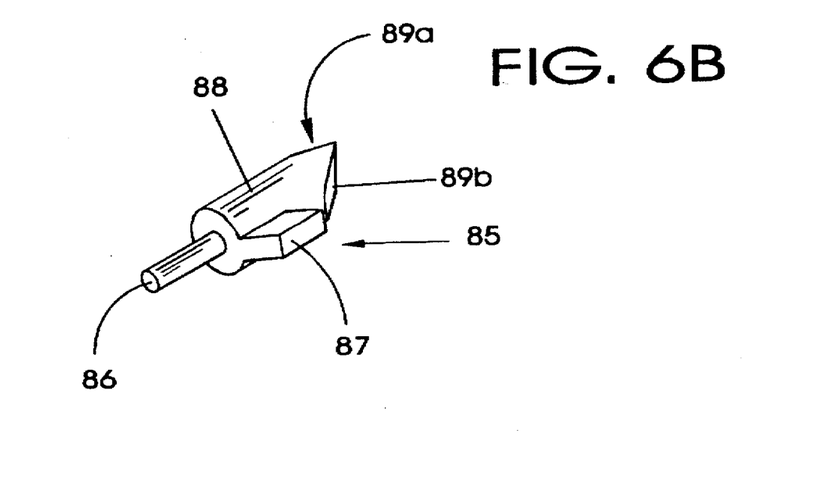
FIG. 6B is a greatly enlarged perspective view of the wedge-shaped hinge axle.

The wedge axle 85 (FIG. 6B) comprises a cylindrical lug 88 that terminates at one end with a pair of radially-inwardly sloping planes 89a, 89b that are sized and configured to be matable with the sloping planes 72a, 72b of the axle receptacle 70. The lug 88 is sized to fit and rotate within the receptacle 70, and is also sized to fit and slide within the flip cover receptacle 30. A shaft 86 of somewhat smaller diameter than the lug 88 extends longitudinally from the lug 88 at the end thereof opposite the sloping planes 89a, 89b. A key 87 extends radially outwardly from the lug 88; the key 87 is sized to fit and slide within the key slot 32 of the flip cover receptacle 30. The key 87 is circumferentially located on the lug 88 so that, when the sloping planes 89a, 89b are oriented to align and mate with the sloping planes 72a, 72b of the axle receptacle 68, the key 87 extends in the general direction in which the flip cover 22 is disposed in the operative position (FIG. 6A).

The spring 90 (FIG. 6A) resides within the flip cover receptacle 30. At one end the spring 90 captures the shaft 81 of the axle 80, and at its opposite the spring 90 captures the shaft 86 of the wedge axle 85. The spring 90 should be of sufficient length that, when the axles 64, 68 are positioned within their respective receptacles 66, 70, the spring 90 is compressed and thereby biases the axles 64, 68 away from one another. For a radiotelephone having a width of between 50 and 65 mm, a spring having a length between about 16 and 22 mm and a spring constant of between about 4 N/mm and 8 N/mm is preferred.

Figure 8:
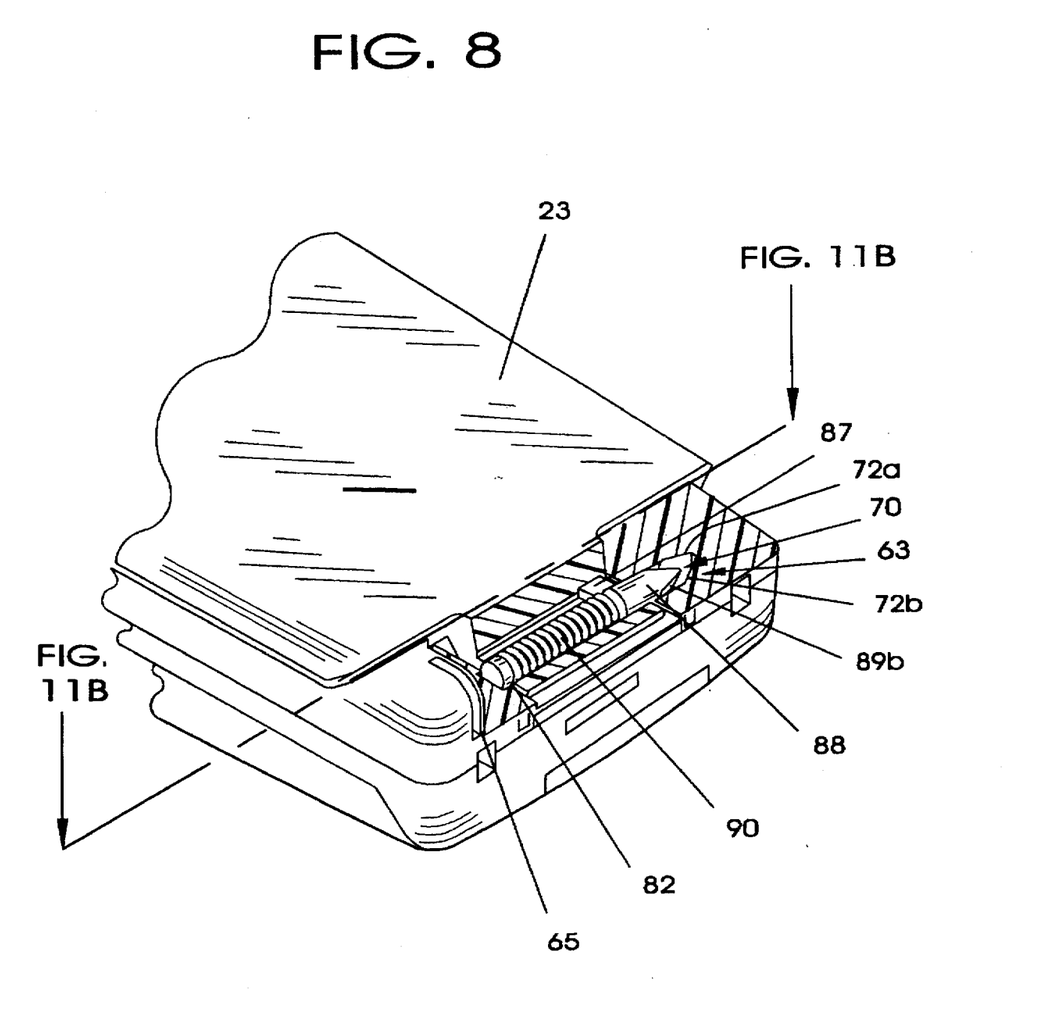
FIG. 8 is an enlarged partial cutaway view of the radiotelephone of the present invention with the flip cover in its closed position.

In operation, the radiotelephone 20 is deactivated, with the flip cover 22 residing in its closed position (FIGS. 4, 8, and 11B). The raised edge 24 of the flip cover 20 contacts the contact surface 46 of the face plate 45. The operation post 28 is inserted into the operation aperture 49, thereby deactivating the radiotelephone 20.

Because the flip cover 22 is in the closed position, the wedge axle 85 is oriented about the pivot axis $A_1$ so that the key 87 extends toward the free end of the flip cover 22 (FIG. 11B). Consequently, the sloping planes 89a, 89b are oriented about the pivot axis At so that they do not mate with the sloping planes 72a, 72b of the receptacle 70. Instead, the sloping planes 89a, 89b contact the sloping planes 72a, 72b such that the edges shared by the respective plane pairs are disposed at an angle of approximately 40 degrees. Simultaneously, the spring 90 urges the wedge axle 85 to translate laterally (i.e., away from the axle 80). The interaction of the axle planes 89a, 89b and the receptacle planes 72a, 72b and the biasing of the wedge axle 85 by the spring 90 causes the wedge axle 85 to be urged to rotate toward a mating position with the sloping planes 72a, 72b. This urging retains the flip cover 22 in the closed position.

Figure 3:
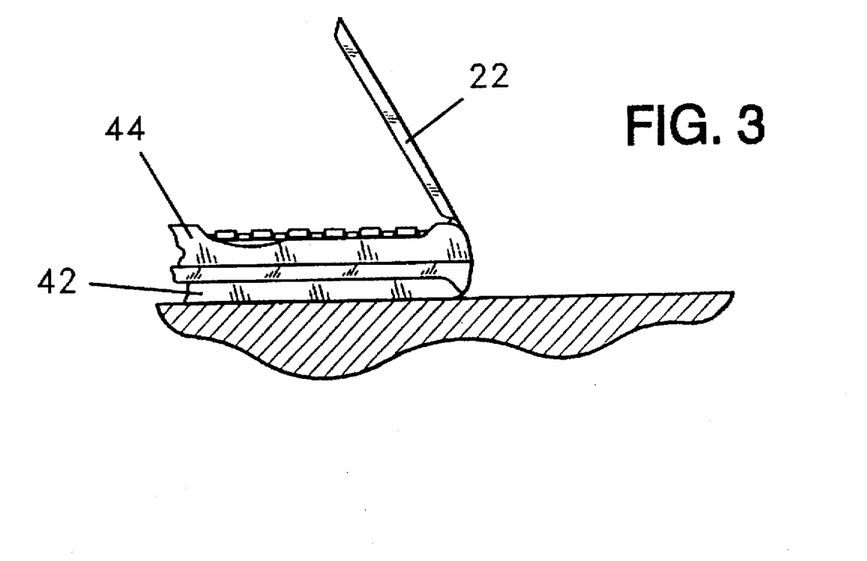
FIG. 3 is a partial side view of a radiotelephone of the present invention with the flip cover in an intermediate position.
Figure 9:
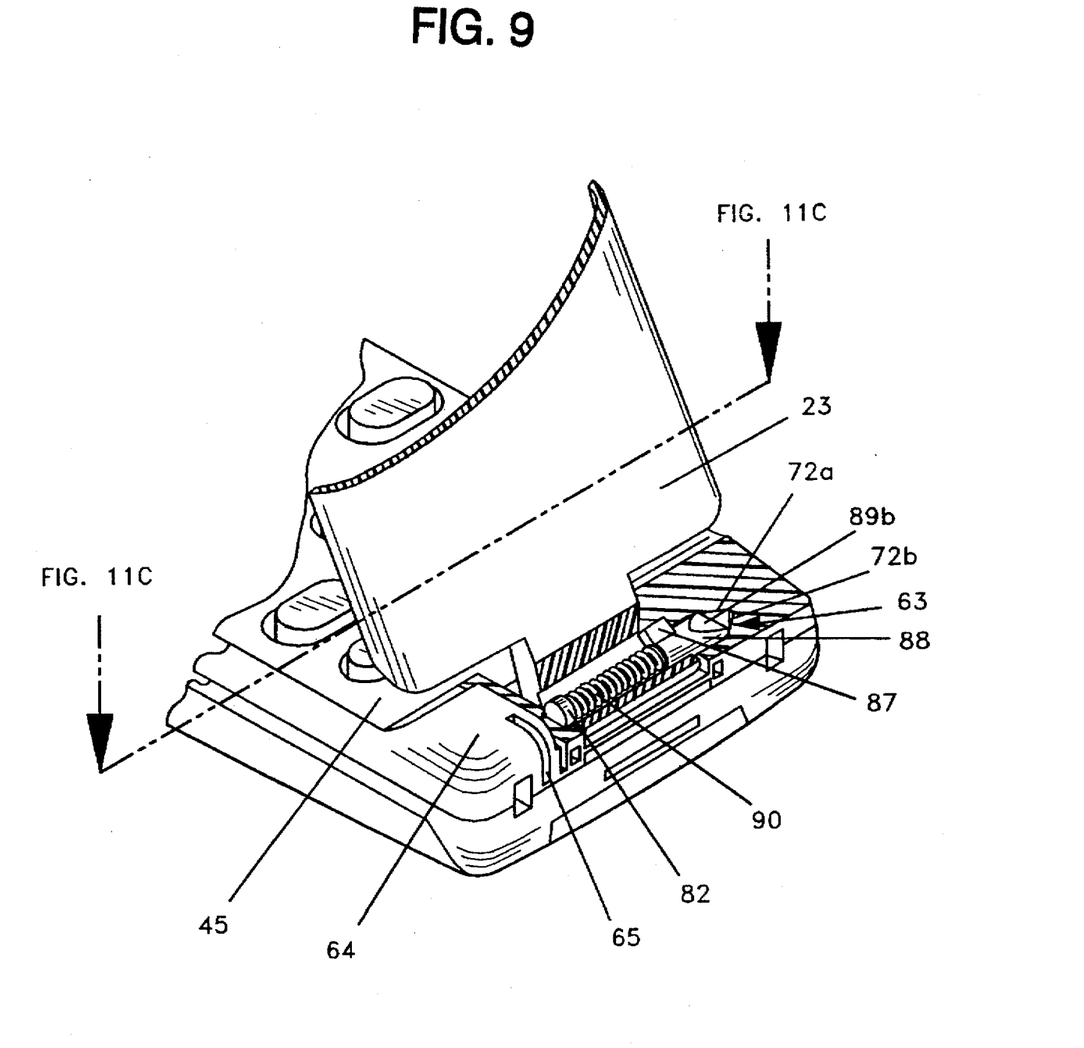
FIG. 9 is an enlarged partial cutaway view of the radiotelephone of the present invention with the flip cover in an intermediate position.

To open the flip cover 22, an upwardly-directed force is applied thereto. The flip cover 22 pivots about the pivot axis $A_1$ through a continuous series of intermediate positions, an exemplary one of which is illustrated in FIGS. 3, 9, and 11C. The wedge axle 85 rotates with the flip cover 22. In the intermediate positions, the wedge axle 85 is oriented about the pivot axis $A_1$ so that the sloping planes 89a, 89b of the wedge axle 85 do not mate with the sloping planes 72a, 72b of the receptacle 70. The absence of mating between the sloping plane pairs forces the wedge axle 85 to translate within the flip cover receptacle 30 toward the axle 80 (FIG. 11C).

From an intermediate position, the flip cover 22 can be moved to the operative position (FIGS. 1, 7, and 11A) by continuing to apply a circumferentially-directed force to the raised edge 24. As the flip cover 22 continues to rotate about the pivot axis $A_1$, the sloping planes 89a, 89b of the wedge axle 85 rotate to an orientation in which they align with, and thus can mate with, the sloping planes 72a, 72b of the receptacle 70 (FIG. 11A). The wedge axle 85 is urged to move to this orientation by the biasing of the spring 90 and the interaction of the sloping plane pairs. In the operative position, the wedge axle 85 has translated (urged by the spring 90) along the pivot axis $A_{a1}$ away from the axle 80. Once the flip cover 22 has moved into the operative position, the interaction between the sloping planes 89a, 89b of the wedge axle 85 and the sloping planes 72a, 72b of the receptacle 70 and the laterally-directed biasing of the wedge axle 85 by the spring 90 urges the flip cover 22 to retain this position.

Preferably and illustratively, the flip cover 22 can also be moved into the fully open position shown in FIGS. 5, 10, and 11D. In this position, the radiotelephone 20 can be inverted and placed on a horizontal surface. This can be desirable if a user wishes to rest the radiotelephone 20 on a flat surface in a stable configuration as it is being used without disconnecting the telephonic signal (as would occur if the flip cover 22 was moved to the closed position). In the illustrated embodiment, placement of the radiotelephone 20 on such a surface can soundproof the microphone 56 from outside noise, with the result that placing the radiotelephone 20 so that the faceplate 45 faces an underlying surface effectively acts to put a caller on "hold." In the fully open position, the sloping planes 89a, 89b of the wedge axle 85 are oriented about the pivot axis $A_1$ so that they are not mated with the sloping planes 72a, 72b of the receptacle 70 (FIG. 11D), but the radiotelephone 20 has sufficient mass that the flip cover 22 will remain in this fully open position rather than returning to the operative position.

Those skilled in this art will appreciate that the wedge axle 85 and the axle receptacle 70 can take different configurations than are illustrated herein and still be suitable for use with the present invention. For example, the disposition of the sloping planes 72a, 72b of the receptacle 70 and the sloping planes 89a, 89b of the wedge axle 85 could be reversed, with the result that the receptacle 70 would have a wedge-shaped portion at its deepest point and the wedge axle 85 would have an inverse wedge-shaped recess at its end. Other mating configurations can be envisioned, including a wedge axle 85 that includes three sloping plane pairs spaced apart 120 degrees from each other about the pivot axis $A_1$ and a receptacle 70 having an inversely configured mating portion. Such a configuration would enable the flip cover 22 to take an operative position between about 100 and 120 degrees from the closed position depending on the degree of biasing desired to retain the flip cover 22 in the closed position.

Also, although the coil spring 90 is preferred for biasing the wedge axle 85 toward the receptacle 70, other biasing means could be used instead, such as straight wire or leaf-style springs, resilient polymeric plugs, and the like.

Typically, the flip cover 22, the top housing 44, and the bottom housing 42 are formed of the same material so that the color and gloss of these separate components can be matched. Preferably, these components are formed of a thermoplastic, with an acrylonitrile-butadiene-styrene terpolymer being particularly preferred. Those skilled in this art will appreciate, however, that other materials may also be suitable for use with this invention.

As demonstrated by the foregoing, the asymmetric hinge configuration embodied in the illustrated radiotelephone 20 satisfies needs presently unmet. The present hinge configuration comprises only five separate parts, and thus is easily assembled. This hinge configuration can be assembled and disassembled with the bottom and top housings 42, 44 of the handset unit 40 completely assembled, thereby facilitating repairs and permitting performance testing to be performed on the assembled handset unit 40 alone. Because only one axle of the hinge configuration translates along the pivot axis $A_1$ during opening and closing of the flip cover 22, a shorter spring 90 can be used for a handset unit 40 of the same width. Also, it is not necessary to provide for lateral space into which the axle 80 can translate. As a result, the microphone 56 can be located on the pivot axis $A_1$ closer to the flip cover 22 and, correspondingly, to the user's mouth. This proximity to the user's mouth provides the design with the option of using a microphone with a less powerful microphone lower gain, lower amplifications, a higher signal to noise ratio and the like.

Those skilled in this art will also appreciate that other devices, such as conventional corded and cordless telephones, tone dialers, remote control units for televisions, stereos, and video players, hand-held calculators, and the like, which might benefit from the inclusion of a flip cover that is pivotable between open and closed positions, can also be used with the hinge configuration of the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An asymmetric hinge configuration comprising:

a first member having a first extension portion, a first axle receptacle and a first lug axle receptacle, each of said receptacles positioned in said first extension portion;

a second member having a second axle receptacle and a second lug axle receptacle having an abutment surface, said second axle and lug axle receptacle defining a first recessed portion therebetween, wherein said first recessed portion is configured to receive said first member extension portion therein; and asymmetric pivotal interconnection means connected to said first and second members for enabling rotation therebetween about an axis of rotation and for preventing axial translation therebetween, said asymmetric pivotal interconnection means comprising:

a projection axle comprising a projection received in and matable with said second axle receptacle and a shaft received in said first axle receptacle, said projection axle being rotatable between first and second rotative positions about said axis of rotation and being translatable between first and second translatory positions along said axis of rotation;

a lug axle received in and matable with said second lug axle receptacle and including a shaft received in said first lug axle receptacle and a lug received in said second lug axle receptacle abutting said abutment surface thereof, said lug axle and said first and second lug axle receptacles configured to enable said first member to rotate between first and second rotative positions about said axis of rotation, with said abutment surface preventing outward axial movement of said lug axle relative to said axis of rotation;

interlocking means for connecting said projection axle with said first member so that said rotation of said first member relative to said second member about said axis of rotation causes corresponding rotation of said projection axle and so that said projection axle is free to translate along said axis of rotation relative to said first axle receptacle, and biasing means operably coupled with said projection axle for biasing said projection axle toward said second axle receptacle;

said projection and said second axle receptacle being configured so that when said projection axle is in the first rotative position, said projection mates with and seats in said second receptacle and said biasing means biases said projection axle to take said first translatory position along said axis of rotation, and when said projection axle is in the second rotative position, said projection is not mated with said second axle receptacle, and interaction between said projection and said second axle receptacle forces said projection axle into the second translatory position along said axis of rotation.

2. The asymmetric hinge configuration of claim 1, wherein said projection comprises a pair of sloped faces symmetric about a plane of symmetry extending through said axis of rotation, and wherein said second axle receptacle comprises a mating pair of planarly symmetric sloped faces.

3. The asymmetric hinge configuration of claim 2, wherein said projection sloped faces are planar faces, and wherein said second axle receptacle faces are planar faces.

4. The asymmetric hinge configuration of claim 3, wherein each of said planar faces of said second axle receptacle comprises an edge adjacent said plane of symmetry, each of said edges being positioned in a lateralmost portion of said second axle receptacle.

5. The asymmetric hinge configuration of claim 1, wherein said interlocking means comprises a keying member extending radially from said axle and a mating recess in said first axle receptacle.

6. The asymmetric hinge configuration of claim 1, wherein said biasing means comprises a spring oriented along said axis of rotation that contacts said axle shaft, said spring being compressed when said axle is in the second translatory position.

7. The asymmetric hinge configuration of claim 1, wherein said projection and said second axle receptacle are configured so that said first member is rotatable to a third rotative position in which said first member and said second member form an angle of between about 170 degrees and 200 degrees therebetween.

8. The asymmetric hinge configuration of claim 1, wherein said second member further comprises a second lug axle receptacle, said first member further comprises a first lug axle receptacle, and said pivotal interconnection means further comprises a lug axle received in said first and second lug axle receptacles that prevents translation of said first member relative to said second member along said axis of rotation but permits rotation of said first and second members about said axis of rotation.

9. The asymmetric hinge configuration of claim 8, wherein said first lug axle receptacle is contiguous with said first axle receptacle.

10. A radiotelephone housing comprising:

a door member comprising an integral hinge arm configured to include a first axle receptacle and a first lug axle receptacle therein;

a handset member comprising a second axle receptacle and a second lug axle receptacle; and asymmetric pivotal interconnection means connected to said door and handset members for enabling rotation therebetween about an axis of rotation and for preventing axial translation therebetween, said axis of rotation being substantially perpendicular to a plane bisecting said door member, said door and handset members being rotatable between a closed position, in which said door member overlies said handset member, and an operative open position, in which said handset member and said door member define an angle of between about 100 and 160 degrees therebetween, said pivotal interconnection means comprising:

a projection axle comprising a projection received in and matable with said second axle receptacle and a shaft received in said first axle receptacle, said projection axle being rotatable between first and second rotative positions about said axis of rotation and being translatable between first and second translatory positions along said axis of rotation, said projection comprising a pair of sloped faces symmetric about a plane of symmetry extending through said axis of rotation, and wherein said second axle receptacle comprises a mating pair of planarly symmetric sloped faces;

a lug axle received in and matable with said second lug axle receptacle having an abutment surface and including a shaft received in said first lug axle receptacle, said lug axle and said first and second lug axle receptacles configured to enable said first member to rotate between first and second rotative positions about said axis of rotation and to prevent outward axial movement of said lug axle relative to said axis of rotation, interlocking means for connecting said projection axle with said door member so that said rotation of said door member relative to said handset member about said axis of rotation causes corresponding rotation of said projection axle and so that said projection axle is free to translate within said first axle receptacle along said axis of rotation, and a spring positioned within said first axle receptacle for biasing said projection axle toward said second axle receptacle;

said projection and said second axle receptacle being configured so that when said projection axle is in the first rotative position, said projection mates with and seats in said second receptacle and said spring biases said projection axle to take said first translatory position along said axis of rotation, thereby placing said door member is in its operative position, and when said projection axle is in the second rotative position, said projection is not mated with said second axle receptacle, and interaction between said projection and said second axle receptacle forces said projection axle into the second translatory position along said axis of rotation, thereby placing said door member in the closed nonoperative position.

11. A radiotelephone housing comprising:

a door member comprising a first axle receptacle and a first lug axle receptacle disposed in an extension portion of said door member;

a handset member comprising a second axle receptacle and a second lug axle receptacle, said second lug axle receptacle having an abutment surface therein, said second axle and second lug axle receptacles defining a first recess portion therebetween, wherein said first recess portion is configured to receive said door member extension portion therein; and asymmetric pivotal interconnection means connected to said door and handset members for enabling rotation therebetween about an axis of rotation and for preventing axial translation therebetween, said axis of rotation being substantially perpendicular to a plane bisecting said door member, said door and handset members being rotatable between a closed position, in which said door member overlies said handset member, and an operative open position, in which said handset member and said door member define an angle of between about 100 and 160 degrees therebetween, said pivotal interconnection means comprising:

a projection axle comprising a projection received in and matable with said second axle receptacle and a shaft received in said first axle receptacle, said projection axle being rotatable between first and second rotative positions about said axis of rotation and being translatable between first and second translatory positions along said axis of rotation, a lug axle received in and matable with said second lug axle receptacle and including a shaft received in said first lug axle receptacle and a lug received in said second lug axle receptacle abutting said abutment surface thereof, said lug axle and said first and second lug axle receptacles configured to enable said first member to rotate between first and second rotative positions about said axis of rotation, with said abutment surface preventing outward axial movement of said lug axle relative to said axis of rotation;

interlocking means for connecting said projection axle with said door member so that said rotation of said door member relative to said handset member about said axis of rotation causes corresponding rotation of said projection axle and so that said projection axle is free to translate within said first axle receptacle along said axis of rotation, and biasing means operably coupled with said projection axle for biasing said projection axle toward said second axle receptacle;

said projection and said second axle receptacle being configured so that when said projection axle is in the first rotative position, said projection mates with and seats in said second receptacle and said biasing means biases said projection axle to take said first translatory position along said axis of rotation, thereby placing said door member is in its operative position, and when said projection axle is in the second rotative position, said projection is not mated with said second axle receptacle, and interaction between said projection and said second axle receptacle forces said projection axle into the second translatory position along said axis of rotation, thereby placing said door member in the closed nonoperative position.

12. The radiotelephone housing of claim 11, wherein said projection comprises a pair of sloped faces symmetric about a plane of symmetry extending through said axis of rotation, and wherein said second axle receptacle comprises a mating pair of planarly symmetric sloped faces.

13. The radiotelephone housing of claim 12, wherein said projection sloped faces are planar faces, and wherein said second axle receptacle faces are planar faces.

14. The radiotelephone housing of claim 13, wherein each of said planar faces of said second axle receptacle comprises an edge adjacent said plane of symmetry, each of said edges being positioned in a lateralmost portion of said second axle receptacle.

15. The radiotelephone housing of claim 11, wherein said interlocking means comprises a keying member extending radially from said axle and a mating recess in said first axle receptacle.

16. The radiotelephone housing of claim 11, wherein said biasing means comprises a spring oriented along said axis of rotation that contacts said axle shaft, said spring being compressed when said axle is in the second translatory position.

17. The radiotelephone housing of claim 11, wherein said projection and said second axle receptacle are configured so that, when said door member is in the closed position, said door member is urged to remain in the closed position.

18. The radiotelephone housing of claim 11, wherein said handset member further comprises a second lug axle receptacle, said door member further comprises a first lug axle receptacle, and said pivotal interconnection means further comprises a lug axle received in said first and second lug axle receptacles that prevents translation of said door member relative to said handset member along said axis of rotation but permits rotation of said door and handset members about said axis of rotation.

19. The radiotelephone housing of claim 18, wherein said first lug axle receptacle is contiguous with said first axle receptacle.

20. The radiotelephone housing of claim 11, wherein said projection and said second axle receptacle are configured so that said door member is rotatable to a third rotative position in which said door member and said handset member form an angle of between about 170 degrees and 200 degrees about said axis of rotation.

21. The radiotelephone housing of claim 11, wherein said door member is a flip cover for a cellular telephone.

22. The radiotelephone housing of claim 11, wherein one of said door member and said handset member includes a cellular telephone microphone therein.

23. The radiotelephone housing of claim 22, wherein said cellular telephone housing includes a cellular telephone transceiver, an antenna electrically connected thereto and a cellular telephone controller electrically connected thereto.

* * * * *